(12) United States Patent
Wang et al.

(10) Patent No.: US 9,628,265 B2
(45) Date of Patent: Apr. 18, 2017

(54) ENCRYPTION PROCESSING DEVICE AND METHOD CAPABLE OF DEFENDING DIFFERENTIAL POWER ANALYSIS ATTACK

(71) Applicant: SHENZHEN STATE MICRO TECHNOLOGY CO., LTD., Shenzhen, Guangdong (CN)

(72) Inventors: Liangqing Wang, Guangdong (CN); Dawu Gu, Guangdong (CN); Zheng Guo, Guangdong (CN); Junrong Liu, Guangdong (CN); Feng Deng, Guangdong (CN)

(73) Assignee: SHENZHEN STATE MICRO TECHNOLOGY CO., LTD., Shenzhen (CN)

( * ) Notice: Subject to any disclaimer, the term of this patent is extended or adjusted under 35 U.S.C. 154(b) by 63 days.

(21) Appl. No.: 14/758,105

(22) PCT Filed: Jun. 18, 2014

(86) PCT No.: PCT/CN2014/080234
§ 371 (c)(1),
(2) Date: Jun. 26, 2015

(87) PCT Pub. No.: WO2015/158038
PCT Pub. Date: Oct. 22, 2015

(65) Prior Publication Data
US 2016/0277180 A1    Sep. 22, 2016

(30) Foreign Application Priority Data
Apr. 16, 2014  (CN) .......................... 2014 1 0153362

(51) Int. Cl.
*G06F 12/14*   (2006.01)
*H04L 9/00*   (2006.01)
(Continued)

(52) U.S. Cl.
CPC ................ *H04L 9/003* (2013.01); *G09C 1/00* (2013.01); *H04L 9/0618* (2013.01); *H04L 2209/046* (2013.01)

(58) Field of Classification Search
None
See application file for complete search history.

(56) References Cited

U.S. PATENT DOCUMENTS

2007/0014395 A1    1/2007  Joshi et al.
2008/0212776 A1*   9/2008  Motoyama ............. H04L 9/003
                                           380/252

FOREIGN PATENT DOCUMENTS

CN    101197660 A    6/2008
CN    101729241 A    6/2010
(Continued)

OTHER PUBLICATIONS

State Intellectual Property Office of the P.R. China (ISR/CN), "International Search Report for PCT/CN2014/080234", China, Dec. 30, 2014.

*Primary Examiner* — Brandon Hoffman
(74) *Attorney, Agent, or Firm* — Locke Lord LLP; Tim Tingkang Xia, Esq.

(57) ABSTRACT

The invention discloses an encryption processing device and a method capable of defending differential power analysis attack. In the encryption processing device provided by an embodiment of the invention, a SecMasking unit is achieved in a structure that a universal random masking technique services as a basis; a SecPrepare unit is achieved in a structure that a bitwise XOR device services as a basis; and a SecSbox unit is achieved in a mode that table look-up results are updated longitudinally and transversely in real time on the basis of a random masking technique. According to the encryption processing device and method, work power consumption of a cryptographic operation equipment
(Continued)

circuit can have no relation with operation data and calculation operations. In addition, the encryption processing device and method can be widely used for encrypting and decrypting operation cryptographic equipment needing high safety performance.

12 Claims, 3 Drawing Sheets

(51) Int. Cl.
   *G09C 1/00* (2006.01)
   *H04L 9/06* (2006.01)

(56) References Cited

FOREIGN PATENT DOCUMENTS

| | | |
|---|---|---|
| CN | 102752103 A | 10/2012 |
| CN | 203933683 U | 11/2014 |

\* cited by examiner

ENCRYPTION PROCESSING DEVICE AND METHOD CAPABLE OF DEFENDING DIFFERENTIAL POWER ANALYSIS ATTACK

TECHNICAL FIELD

The invention belongs to the field of information safety technology, in this regard, relates to an encryption processing device and a method capable of defending Differential Power Analysis (DPA) attack.

BACKGROUND ART

Encryption technique is generally divided into two classes: symmetric block cryptographic algorithm and asymmetric block cryptographic algorithm, wherein the symmetric block cryptographic algorithm means that both encryption and decryption use the same key, such encryption technique is widely adopted at present, such as DES (Data Encryption Standard) adopted by the American government is a typical "symmetric" encryption, and the Session Key length thereof is 56 bits. The asymmetric block cryptographic algorithm means that the encryption and the decryption do not use the same key, but generally a "public key" and a "private key" having to be used in pair are provided.

Figure 1:
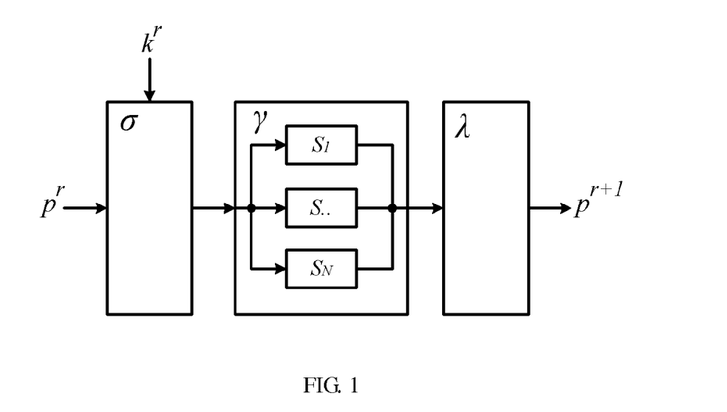
FIG. 1 is a schematic diagram showing a typical round transformation framework of a symmetric block cryptographic algorithm in which a nonlinear layer consists of a plurality groups of nonlinear Sbox look-up transformations.

Taking the example of the typical asymmetric block cryptographic algorithm, as shown in FIG. 1, r represents the round number of the current round transformation, p and k represent the round block data and round key respectively, σ and λ represent linear layer transformation in the round, while the unique nonlinear layer transformation γ basically consists of a plurality of Sbox nonlinear transformations. The framework as shown in FIG. 1 is applicable to not only AES (Advanced Encryption Standard), DES and other common symmetric block cryptographic algorithms, but also known or unknown other symmetric block cryptographic algorithms containing the nonlinear Sbox framework.

Cryptanalysis is an important branch of cryptography, the typical cryptanalysis usually does not consider the specific implementation of a crypto system, but discovers the key information or unsafe factor in the crypto system by means of mathematical reasoning, statistical analysis, high performance computing, provable safety ways. These analysis methods include differential analysis, linear analysis, correlation key analysis, algebraic analysis, linear approximation, difficult problem solving and reduction proof, etc.

But in practice, the crypto system is generally achieved by hardware or software in the form of the hardware, such as smart card, RFID (Radio Frequency Identification), cryptographic coprocessor, SoC (System on Chip) cryptographic chip, and cryptographic machine, etc. In achieving environment of these crypto systems, an attacker can make a "black box" inquiry, and also obtain the hardware structure and encoding implementation of the algorithm through reverse engineering, microprobing technology and other means, and can observe and measure cryptographic transformation running time, energy consumption, electromagnetic radiation and other information, or can even "intervene" the normal operation of the cryptographic transformation to make it wrong. The attacker who makes use of the additional information is possible to achieve cryptographic breaking more effectively than the "black box attack". People call the attack under such environment as "Side Channel Attack". Thanks to the efficient attack performance, the international academia, industry and various national governments have paid high attention to and concerned on the Side Channel Attack, which has become one of the most rapid directions developed in the field of cryptanalysis and cryptographic engineering.

The DPA is the most widely used method for SCA, the key in the cryptographic equipment can be restored from a power curve formed by recording the block encryption or decryption operation of a number of different data by the cryptographic equipment. The DPA uses the plurality of power curves to analyze the energy consumption condition of the equipment at a fixed time by making uses of the data dependence of the energy consumption of the cryptographic equipment, and the energy consumption is deemed as a function of the processed data.

The DPA attack is implemented on the basis that the power consumption of the cryptographic equipment depends on the intermediate value of the cryptographic algorithm executed by the equipment. Therefore, if such attack is attempted to defend, the dependence needs to be reduced or even eliminated. Two common defending methods are provided: concealing and masking.

The concealing strategy is to eliminate the correlation between the power consumption of the cryptographic equipment and the intermediate value of the operation during the process of the equipment. The goal can be achieved in two ways of: first, building the cryptographic equipment in a special way to randomize the power consumption, which means that the power consumption of the equipment at each clock cycle is randomly distributed; and second, enabling the equipment to have the same power consumption on all operations and all operands, i.e., the equipment has equal power consumption in each clock cycle.

The core idea of the masking technique is that: at the beginning of the calculation, first, some random masks are used to carry out masking operation on the information and the key, and all subsequent operations are almost the same as the conventional calculation process; however, in the last few steps of certain particular steps, for example, at the end of some round encryption transformation, or at the end of the linear operation in the calculation process, the value of the mask must be known, so as to restore the expected data value at the end of the calculations.

However, in the above-mentioned strategies, the unique true table look-up operation is masked by using a lot of redundant false table look-up operations to improve the safety in the nonlinear operation represented by the Sbox table look-up operation, which is inevitable to pay more expenses on the area resource. In addition, the safety is improved by using additive and multiplicative random mask factors and the transformation operation among different polarity number fields in the nonlinear operation represented by the Sbox table look-up operation, which also cause great increase in the cost of the area resource, so as not to be conducive to achieving the encryption processing device and method capable of defending the DPA attack in a resource-constrained environment.

SUMMARY OF THE INVENTION

In view of this, the embodiment of the invention aims at providing an encryption processing device capable of defending DPA attack specific to cryptographic algorithm containing Sbox look-up table operation and a method thereof.

In order to achieve the above objectives, the present invention is embodied by the follow technical solution:

An encryption processing device capable of defending differential power analysis attack, comprising:

a mask processing circuit (SecMasking) unit, used for splitting source data $p^r$ expected to carry out Sbox table look-up operations into a plurality of random data on the basis of a random masking technique;

a preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and a Sbox circuit (SecSbox) unit, used for carrying out longitudinal and transverse Sbox look-up process and real-time updating process of the preprocessing data $b^r$ on the basis of the random masking technique and according to a random digit $y^r$ and a random digit $z^r$.

Preferably, the SecMasking unit comprises a D trigger D0, a D trigger D1 and a D trigger D2 as well as a bitwise XOR device X1 and a bitwise XOR device X2, wherein the source data $p^r$ and a random digit $i^r$ are provided to two input ends of the bitwise XOR device X1 respectively;

the output end of the bitwise XOR device X1 is connected with one input end of the bitwise XOR device X2, and a random digit $j^r$ is provided to the other end of the bitwise XOR device X2;

the output end of the bitwise XOR device X2 is connected with the data input end of the D trigger D0;

the random digit $j^r$ is connected with the data input end of the D trigger D1;

the random digit $i^r$ is connected with the data input end of the D trigger D2; and the output ends of the D trigger D0, the D trigger D1 and the D trigger D2 are connected with the corresponding input end of the SecPrepare unit.

Preferably, the SecPrepare unit comprises a bitwise XOR device X3, a bitwise XOR device X4 and a bitwise XOR device X5, a linear transformation unit σ0, a linear transformation unit σ1 and a linear transformation unit σ2, an AddRoundKey transformation unit ARK, and a gcnt participated transformation unit GADD, wherein the currently effective cryptographic algorithm sub-key $k^r$ and the random digit $x^r$ are provided to the input ends of the bitwise XOR device X3 respectively;

three data $p^r_0$, $p^r_1$, $p^r_2$ output by the D trigger D0, the D trigger D1 and the D trigger D2 contained in the SecMasking unit are accordingly provided to the input ends of the linear transformation unit σ0, the linear transformation unit σ1 and the linear transformation unit σ2;

both the output end of the bitwise XOR device X3 and the output end of the linear transformation unit σ0 are connected with two input ends of the AddRoundKey transformation unit ARK respectively;

the output end of the linear transformation unit σ1 and the output end of the linear transformation unit σ2 are connected with two input ends of the bitwise XOR device X4 respectively;

the output end of the AddRoundKey transformation unit ARK and the output end of the bitwise XOR device X4 are connected with two input ends of the bitwise XOR device X5 respectively;

the output end of the bitwise XOR device X5 is connected with one input end of the gcnt participated transformation unit GADD, and the random digit $x^r$ and the real-time updating variable gcnt are provided to another two input ends of the gcnt participated transformation unit GADD respectively; and the output end of the gcnt participated transformation unit GADD is connected with the input end of the SecSbox unit.

Preferably, the gcnt participated transformation unit GADD carries out the following processes on the basis of the input information:

carrying out bitwise XOR operation on the output information of the bitwise XOR device X5 and the random digit $x^r$; and carrying out Boolean addition operation on the bitwise XOR operation results and the real-time updating variable gcnt, and outputting the preprocessing data $b^r$.

Preferably, the SecSbox unit comprises N non-linear transformation SecS basic units, in the SecSbox unit:

the preprocessing data $b^r$ output by the SecPrepare unit is divided into a plurality of copies and input into the corresponding N differential SecS basic units respectively;

both the random digit $y^r$ and the random digit $z^r$ are provided to another two input ends of each SecS basic unit respectively; and the same type of output end of each SecS basic unit is subject to piecing process respectively to form an output end data $m^r_0$, an output end data $m^r_1$ and an output end data $m^r_2$, wherein the bitwise XOR operation results of the output end data $m^r_0$, the output end data $m^r_1$ and the output end data $m^r_2$ are equal to the relevant arithmetic operation results on the basis of the source data $p^r$, the cryptographic algorithm sub-key $k^r$ and cryptographic algorithm common Sbox table look-up operation.

Preferably, the SecS basic unit comprises a multiplexer M0, a multiplexer M1 and a multiplexer M2, corresponding a D trigger group Dm00~Dm0k, a D trigger group Dm10~Dm1k and a D trigger group Dm20~Dm2k, and a bitwise XOR device group Xm00~Xm0k, a bitwise XOR device group Xm10~Xm1k and a bitwise XOR device group Xm20~Xm2k, wherein after the preprocessing data $b^r$ output by the SecPrepare unit are divided into a plurality of copies, the data $b^{ir}$ provided to the current SecS basic unit are provided to control selection ends of the multiplexer M0, the multiplexer M1 and the multiplexer M2;

a plurality of data alternative ends of the multiplexer M0, the multiplexer M1 and the multiplexer M2 are connected with the output ends of the plurality of D triggers in the corresponding D trigger group, respectively;

the output ends of the plurality D triggers in the D trigger group corresponding to the multiplexer M0, the multiplexer M1 and the multiplexer M2 are connected with the output ends of the plurality of bitwise XOR devices in the corresponding bitwise XOR device group respectively;

the random digit $y^r$ is provided to one input end of the plurality of bitwise XOR devices in the bitwise XOR device group Xm00~Xm0k respectively, the random digit $z^r$ is provided to one input end of the plurality of bitwise XOR devices in the bitwise XOR device group Xm10~Xm1k respectively, and the bitwise XOR operation results of the random digit $y^r$ and the random digit $z^r$ are provided to one input end of the plurality of bitwise XOR devices in the bitwise XOR device group Xm20~Xm2k respectively;

the output ends of the plurality of D triggers in the D trigger group are connected with the corresponding other input ends of the plurality of bitwise XOR devices in the bitwise XOR device group in an annular chain type; and the output ends of the multiplexer M0, the multiplexer M1 and the multiplexer M2 output data to be spliced $m^{ir}_0$, $m^{ir}_1$ and $m^{ir}_2$, respectively, wherein i=1~N.

An integrated circuit chip, comprises the encryption processing device capable of defending the differential power analysis attack, comprising:

a mask processing circuit (SecMasking) unit, used for splitting source data $p^r$ expected to carry out Sbox table look-up operations into a plurality of random data on the basis of a random masking technique;

a preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and a Sbox circuit (SecSbox) unit, used for carrying out longitudinal and transverse Sbox look-up process and real-time updating process of the preprocessing data $b^r$ on the basis of the random masking technique and according to a random digit $y^r$ and a random digit $z^r$.

A cryptographic equipment, comprises the integrated circuit chip, which comprises the encryption processing device capable of defending the differential power analysis attack, comprising:

a mask processing circuit (SecMasking) unit, used for splitting source data $p^r$ expected to carry out Sbox table look-up operations into a plurality of random data on the basis of a random masking technique;

a preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and a Sbox circuit (SecSbox) unit, used for carrying out longitudinal and transverse Sbox look-up process and real-time updating process of the preprocessing data $b^r$ on the basis of the random masking technique and according to a random digit $y^r$ and a random digit $z^r$.

An encryption processing method capable of defending differential power analysis attack, comprising the following steps of:

dividing source data $p^r$ expected to Sbox table look-up operations into a plurality of random data on the basis of a random masking technique;

carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and carrying out longitudinal and transverse Sbox look-up process and real-time updating process of the preprocessing data $b^r$ on the basis of the random masking technique and according to a random digit $y^r$ and a random digit $z^r$.

Preferably, the mutual XOR results of the plurality of random data are equal to the source data $p^r$.

Preferably, a plurality of target data are obtained after carrying out longitudinal and transverse Sbox look-up process and real-time updating process of the preprocessing data $b^r$ on the basis of the random masking technique and according to a random digit $y^r$ and a random digit $z^r$;

expected look-up result $m^r$ can be obtained by mutual XOR operation process on the plurality of target data; or, the plurality of target data can be used as the source data for the next Sbox table look-up operation.

In the embodiment of the invention, a SecMasking unit is achieved in a structure that a universal random masking technique services as a basis; a SecPrepare unit is achieved in a structure that a bitwise XOR device services as a basis; a SecSbox unit is achieved in a mode that table look-up results are updated longitudinally and transversely in real time on the basis of a random masking technique. The scheme of adopting "table look-up results are updated longitudinally and transversely in real time on the basis of a random mask technique" for the nonlinear operation represented by the Sbox table look-up operation takes place of the scheme of "using a lot of redundant false table look-up operations to mask the unique true table look-up operation" to obtain higher safety performance of a circuit structure at a little price of area resource.

Moreover, in the invention, the scheme of adopting "table look-up results are updated longitudinally and transversely in real time on the basis of a random mask technique" for the nonlinear operation represented by the Sbox table look-up operation takes place of the scheme of "using additive and multiplicative random mask factors and the transformation operation among different polarity number fields". It is possible to obtain enough safety performance for achieving the encryption processing device and method capable of defending the DPA attack in a resource-constrained environment.

According to the encryption processing device and method, work power consumption of a cryptographic operation equipment circuit can have no relation with operation data and calculation operations. In addition, the encryption processing device and method can be widely used for encrypting and decrypting operation cryptographic equipment needing high safety performance.

The achievement of the purpose, the functional characteristics and excellent effect of the invention are further described hereunder by reference to the specific embodiments and the attached drawings.

DETAILED DESCRIPTION OF PREFERRED EMBODIMENTS

The technical scheme of the invention is further described for details hereunder by reference to the attached drawings and the specific embodiments, so that those skilled in the art may better understand the invention and implement, but the illustrated embodiment is not the limitation to the invention.

Any component, unit, operation or transformation used in the description of the embodiment of the invention should not be interpreted to be critical for or necessary to the invention, unless otherwise described explicitly.

Figure 2:
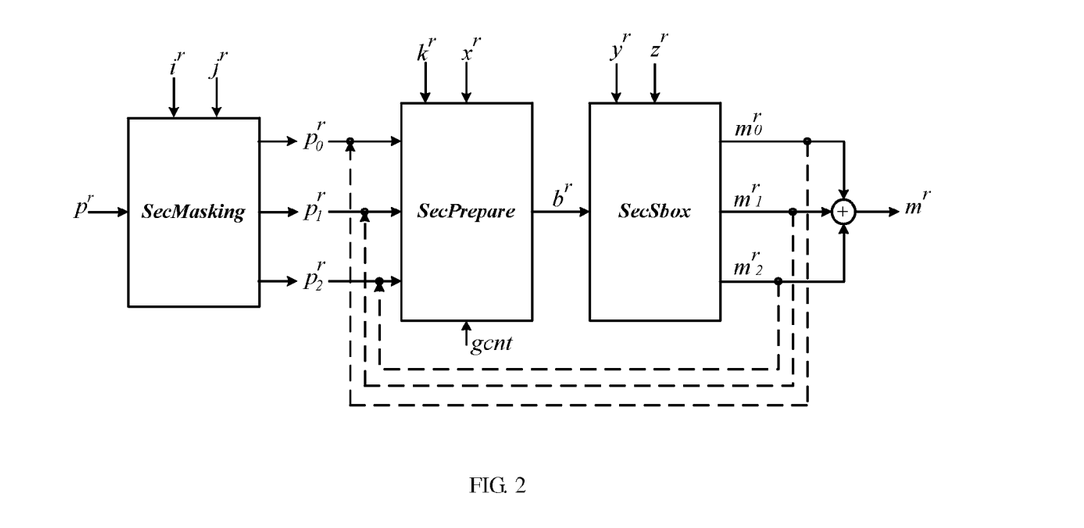
FIG. 2 is a schematic structural diagram for achieving a circuit of an encryption processing device capable of defending (second-order) DPA attack specific to cryptographic algorithm containing Sbox table look-up operation provided by the embodiment of the invention.

As shown in FIG. 2, a schematic structural diagram of an encryption processing device capable of defending DPA attack provided by the embodiment of the invention is shown, and the encryption processing device comprises:

A mask processing circuit unit (hereinafter referred to as a SecMasking unit), used for splitting source data $p^r$ expected to carry out S-box table look-up operations into a plurality of random data on the basis of a random mask technique;

A preprocessing circuit unit (hereinafter referred to as a SecPrepare unit), used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and A Sbox circuit unit (hereinafter referred to as a SecSbox unit), used for carrying out longitudinal and transverse Sbox look-up process and real-time updating process of the preprocessing data $b^r$ on the basis of the random mask technique and according to a random digit $y^r$ and a random digit $z^r$.

In the embodiment of the invention, the SecMasking unit is achieved in a structure that a universal random mask technique services as a basis, in addition, the mutual XOR result of the plurality of random data is equal to the source data $p^r$; the SecPrepare unit is achieved in a structure that a bitwise XOR device services as a basis; and the SecSbox unit is achieved in a mode that table look-up results are updated longitudinally and transversely in real time on the basis of a random mask technique. In the embodiment, the non-linear calculation operation in the cryptographic algorithm is represented by the Sbox table look-up operation.

Figure 3:
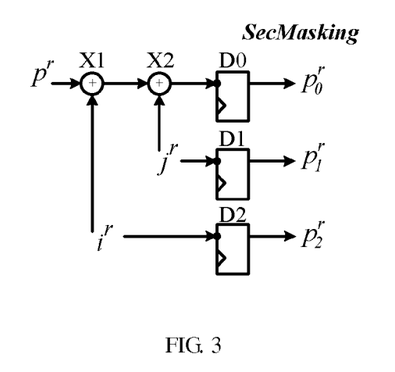
FIG. 3 is a schematic structural diagram for achieving a SecMasking unit provided by the embodiment of the invention.

In the embodiment, as shown in FIG. 3, the SecMasking unit comprises a D trigger D0, a D trigger D1 and a D trigger D2 as well as a bitwise XOR device X1 and a bitwise XOR device X2, and the source data $p^r$ expected to carry out the Sbox table look-up operation is divided into three shares on the basis of the random masking technique, and thus is capable of defending the second-order differential power analysis. In the SecMasking unit:

(1) The source data $p^r$ and a random digit $i^r$ are provided to two input ends of the bitwise XOR device X1 respectively;

(2) The output end of the bitwise XOR device X1 is connected with one input end of the bitwise XOR device X2, and a random digit $j^r$ is provided to the other end of the bitwise XOR device X2;

(3) The output end of the bitwise XOR device X2 is connected with the data input end of the D trigger D0;

(4) The random digit $j^r$ is connected with the data input end of the D trigger D1;

(5) The random digit $i^r$ is connected with the data input end of the D trigger D2;

and (6) The output ends of the D trigger D0, the D trigger D1 and the D trigger D2 are connected with the corresponding input end of the SecPrepare unit.

The SecMasking unit plays a role in dividing the given source data $p^r$ of the Sbox table look-up operation into a plurality of random data ($p^r_0$, $p^r_1$, and $p^r_2$ as shown in FIG. 3) on the basis of the different random digits ($i^r$ and $j^r$ as shown in FIG. 3) in each Sbox table look-up operation of the cryptographic equipment, and it satisfies that the XOR results of the plurality of random data ($p^r_0$, $p^r_1$, and $p^r_2$) are still $p^r$.

The beneficial effects of such transformation operation are that: the source data of each Sbox table look-up operation is not used for the table look-up operation directly in the overall situation, but replaced by more Sbox table look-up operations on multiple mathematically-random shares of the source data, so as to make it harder to achieve the power analysis of the real source data, i.e. increase the theoretical analysis attack cost from one unit to at least a plurality of units, for example, the three units corresponding in the embodiment.

Figure 4:
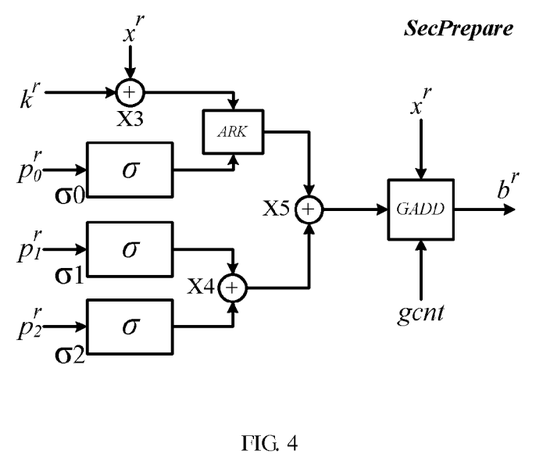
FIG. 4 is a schematic structural diagram for achieving a SecPrepare unit provided by the embodiment of the invention.

In the embodiment, as shown in FIG. 4, the SecPrepare unit comprises a bitwise XOR device X3, a bitwise XOR device X4 and a bitwise XOR device X5, a linear transformation unit σ0, a linear transformation unit σ1 and a linear transformation unit σ2, an AddRoundKey transformation unit ARK, and a gcnt participated transformation unit GADD, wherein (1) The currently effective cryptographic algorithm sub-key $k^r$ and the random digit $x^r$ are provided to the input ends of the bitwise XOR device X3 respectively;

(2) Three data $p^r_0$, $p^r_1$, $p^r_2$ output by the D trigger D0, the D trigger D1 and the D trigger D2 contained in the SecMasking unit are accordingly provided to the input ends of the linear transformation unit σ0, the linear transformation unit σ1 and the linear transformation unit σ2;

(3) Both the output end of the bitwise XOR device X3 and the output end of the linear transformation unit σ0 are connected with two input ends of the AddRoundKey transformation unit ARK respectively;

(4) The output end of the linear transformation unit σ1 and the output end of the linear transformation unit σ2 are connected with two input ends of the bitwise XOR device X4 respectively;

(5) The output end of the AddRoundKey transformation unit ARK and the output end of the bitwise XOR device X4 are connected with two input ends of the bitwise XOR device X5 respectively;

(6) The output end of the bitwise XOR device X5 is connected with one input end of the gcnt participated transformation unit GADD, and the random digit $x^r$ and the real-time updating variable gcnt are provided to another two input ends of the gcnt participated transformation unit GADD respectively; and (7) The output end of the gcnt participated transformation unit GADD is connected with the input end of the SecSbox unit.

The linear transformation unit σ0, the linear transformation unit σ1 and the linear transformation unit σ2 are used for one linear transformation operation that may be defined before the Sbox table look-up operation in the cryptographic algorithm in the embodiment.

The AddRoundKey transformation unit ARK is used for one transformation operation that may be defined and combine the table look-up data to be performed and the currently effective cryptographic algorithm sub-key $k^r$ for cryptographic operation before the Sbox table look-up operation in the cryptographic algorithm in the embodiment.

The gcnt participated transformation unit GADD is used for counteracting the participation of the random digit $x^r$ in the embodiment and adding the participation of the real-time updating variable gcnt to achieve the scheme of "the table look-up result of the SecSbox unit circuit is longitudinally updated on the basis of the random masking technique in real time".

For example, in a mode of execution, the gcnt participated transformation unit GADD carries out the following processes on the basis of the input information:

(1) Carrying out bitwise XOR operation on the output information of the bitwise XOR device X5 and the random digit $x^r$; and (2) Carrying out Boolean addition operation on the bitwise XOR operation results and the real-time updating variable gcnt, and outputting the preprocessing data $b^r$.

It is not difficult to know that those skilled in the art can change and modify the achievement structure of the gcnt participated transformation unit GADD of the invention as required to protect, without substantially departing from the spirit and principles of the invention. All the modifications and changes are contained in the scope of the invention.

The SecPrepare unit plays a role in carrying out the AddRoundKey transformation operation defined by the cryptographic algorithm standard and improving the safety due to the participation of the random digit $x^r$ on the plurality of intermediate random data (e.g., $p^r_0$, $p^r_1$ and $p^r$ as shown in FIG. 4) output by the SecMasking unit and the currently effective cryptographic algorithm sub-key $k^r$ of the cryptographic algorithm with the participation of the new random digit $x^r$.

In addition, the relevant transformation operation with the participation of the real-time updating variable gcnt is further added in order to achieve the safety of the subsequence SecSbox transformation unit. The SecPrepare circuit unit in such design has the beneficial effects of: not only improving the safety of the subsequence SecSbox transformation operations, but also avoiding changing the achievement structure of the so-called cryptographic algorithm round key expansion operation, thus saving the cost of the area resource of the cryptographic equipment.

In the embodiment of the invention, preferably, a plurality of target data are obtained after carrying out longitudinal and transverse Sbox look-up process and real-time updating process of the preprocessing data $b^r$ on the basis of the random masking technique and according to a random digit $y^r$ and a random digit $z^r$; in the event of specific implementation, in the final step of cryptographic operation, the expected look-up result $m^r$ can be obtained by mutual XOR operation process on the plurality of target data; or in the intermediate step of the cryptographic operation, the plurality of target data can be used as the source data for the next Sbox table look-up operation.

Figure 5:
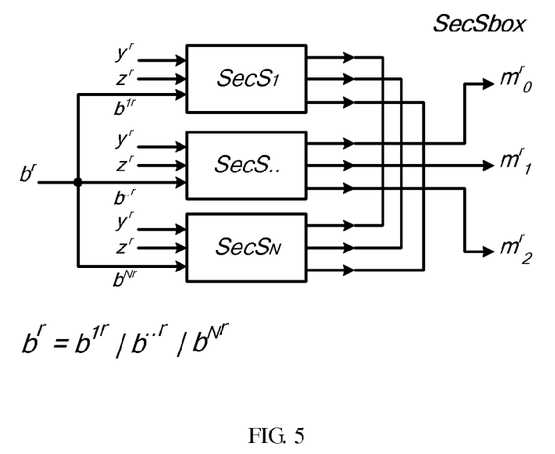
FIG. 5 is a schematic structural diagram for achieving a SecSbox unit provided by the embodiment of the invention.

As shown in FIG. 5, the SecSbox unit comprises N non-linear transformation SecS basic unit, in particular, in the SecSbox:

(1) The preprocessing data $b^r$ output by the SecPrepare unit is divided into a plurality of copies (i.e., $b^{1r}$, $b^{\cdots r}$ in FIG. 5, $b^{Nr}$ represents N copies, meeting $b^r=\{b^{1r}|b^{\cdots r}|b^{Nr}\}$) and input into the corresponding N differential SecS basic units respectively; and each copy of data of the divided $b^r$ is connected with one input end of the corresponding SecS basic unit (i.e., $b^{ir}$ and SecSi as shown in FIG. 5, wherein i=1, . . . , N);

(2) Both the random digit $y^r$ and the random digit $z^r$ are provided to another two input ends of each SecS basic unit respectively; and (3) The same type of output end of each SecS basic unit is subject to piecing process respectively to form an output end data $m^r_0$, an output end data $m^r_1$ and an output end data $m^r_2$, wherein the bitwise XOR operation results of the output end data $m^r_0$, the output end data $m^r_1$ and the output end data $m^r_2$ are equal to the relevant arithmetic operation results on the basis of the source data $p^r$, the cryptographic algorithm sub-key $k^r$ and cryptographic algorithm common Sbox table look-up operation.

For example, in one description of the preferred embodiment, the output data of the SecSbox unit can be divided into three shares, and thus the second-order DPA attack can be defended by the data division. It is not difficult to know that those skilled in the art can change and modify the output data of the SecSbox unit, without substantially departing from the spirit and principles of the invention. All the modifications and changes need to be contained in the scope disclosed by the invention.

The SecSbox circuit unit plays a main role in dividing input objects for the several SecS basic units inside it and introducing the random digit y' and the random digit z', so as to attempt to achieve the relevant power masking in the SecS transformation operation via the random masking technique.

Figure 6:
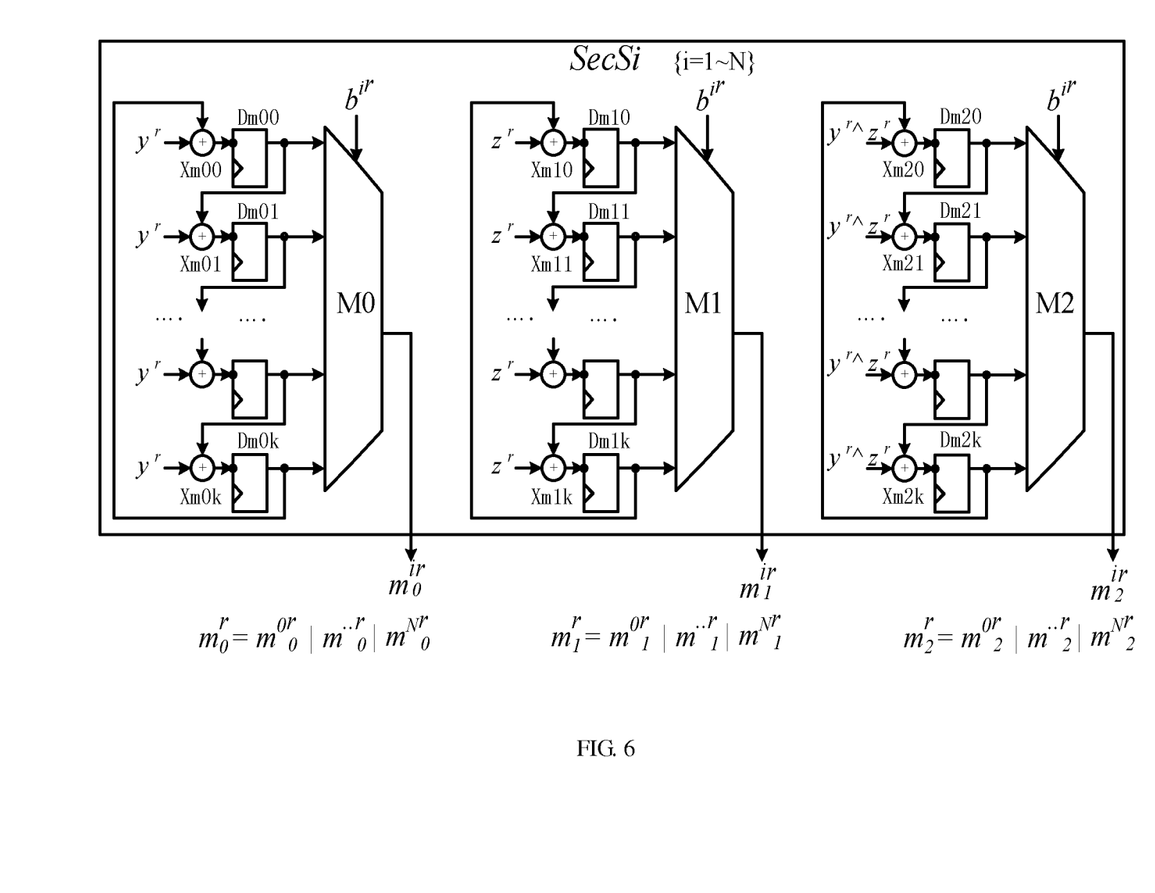
FIG. 6 is a schematic structural diagram for achieving a SecS basic unit provided by the embodiment of the invention.

In the embodiment of the invention, as shown in FIG. 6, the SecS basic unit comprises a multiplexer M0, a multiplexer M1 and a multiplexer M2, their corresponding a D trigger group Dm00~Dm0k, a D trigger group Dm10~Dm1k and a D trigger group Dm20~Dm2k, and a bitwise XOR device group Xm00~Xm0k, a bitwise XOR device group Xm10~Xm1k and a bitwise XOR device group Xm20~Xm2k, the SecS basic unit consists of three groups of similar basic units, capable of defending the second-order DPA attack. In particular, wherein:

(1) After the preprocessing data $b^r$ output by the SecPrepare unit are divided into a plurality of copies, the data $b^{ir}$ provided to the current SecS basic unit are provided to control selection ends of the multiplexer M0, the multiplexer M1 and the multiplexer M2;

(2) A plurality of data alternative ends of the multiplexer M0, the multiplexer M1 and the multiplexer M2 are connected with the output ends of the plurality of D triggers in the corresponding D trigger group, respectively;

(3) The output ends of the plurality D triggers in the D trigger group corresponding to the multiplexer M0, the multiplexer M1 and the multiplexer M2 are connected with the output ends of the plurality of bitwise XOR devices in the corresponding bitwise XOR device group respectively;

(4) The random digit $y^r$ is provided to one input end of the plurality of bitwise XOR devices in the bitwise XOR device group Xm00~Xm0k respectively, the random digit $z^r$ is provided to one input end of the plurality of bitwise XOR devices in the bitwise XOR device group Xm10~Xm1k respectively, and the bitwise XOR operation results of the random digit $y^r$ and the random digit $z^r$ are provided to one input end of the plurality of bitwise XOR devices in the bitwise XOR device group Xm20~Xm2k respectively;

(5) The output ends of the plurality of D triggers in the D trigger group are connected with the corresponding other input ends of the plurality of bitwise XOR devices in the bitwise XOR device group in an annular chain type; for example, the other input end of the plurality of bitwise XOR devices in each bitwise XOR device group is connected with the output end of the adjacent D trigger in the D trigger group corresponding to the XOR device group accordingly, thereby forming a chained ring;

(6) The output ends of the multiplexer M0, the multiplexer M1 and the multiplexer M2 output data to be spliced $m^{ir}_0$, $m^{ir}_1$ and $m^{ir}_2$, respectively, wherein i=1~N.

The SecS basic unit plays a main role in achieving the safety table look-up operation of the input data. One of the safety characteristics is to equivalently transform the table look-up operation of the single object into the plurality of table look-up operations, i.e., to transversely update in real time on the basis of the random masking technique; and the other of the safety characteristics is to transfer and store the table look-up result between relevant table look-up registers in real time, i.e., to longitudinally update in real time on the basis of the random masking technique.

In the embodiment of the invention, the most obvious advantages of the above-mentioned safety characteristics are as follows: transforming the direct and cured table look-up operation on the input data into the plurality of indirect and dynamically updated table look-up operation, thereby greatly masking the leakage of power consumption information of the original table look-up operation. With using the above-mentioned defending means described in the invention, an attacker originally only needs to collect the single copy of the power consumption information, but now needs to collect the plurality of power consumption information leaked at the same time in order to implement the DPA attack. In this way, not only the sample collection quantity and the collection difficulty of the power consumption information as required for the analysis attack are greatly increased, but also the calculation complexity of the DPA is increased exponentially.

Thus, by adopting the invention, in plurality of parts the most critical nonlinear transformation leakage power consumption which is represented by the Sbox table look-up operation in the cryptographic algorithm can be masked via the universal random masking technique at the premise of not greatly increasing the cost of the area resource.

Correspondingly, the embodiment of the invention further provides an integrated circuit chip, comprising the encryption processing device capable of defending the differential power analysis attack as stated in the embodiment, the encryption processing device comprises the mask processing circuit (SecMasking) unit, used for splitting source data $p^r$ expected to carry out Sbox table look-up operations into the plurality of random data on the basis of the random masking technique;

the preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and the Sbox circuit (SecSbox) unit, used for carrying out longitudinal and transverse Sbox look-up process and real-time updating process of the preprocessing data $b^r$ on the basis of the random mask technique and according to the random digit $y^r$ and the random digit $z^r$.

The detailed description of the encryption processing device can refer to the abovementioned embodiments, so as not to repeat here.

The embodiment of the invention accordingly also provides cryptographic equipment comprising an integrated circuit chip as stated in the abovementioned embodiment. Such the cryptographic equipment may be a smart card, RFID, cryptographic coprocessors, a SoC cryptographic chip, or a cryptographic machine, etc. The integrated circuit chip includes, for example, the encryption processing device capable of defending the DPA attack as stated in the above-mentioned embodiment, in the same manner, the encryption processing device comprises:

The mask processing circuit (SecMasking) unit, used for splitting source data $p^r$ expected to carry out Sbox table look-up operations into the plurality of random data on the basis of the random masking technique;

The preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and The Sbox circuit (SecSbox) unit, used for carrying out longitudinal and transverse Sbox look-up process and real-time updating process of the preprocessing data $b^r$ on the basis of the random mask technique and according to the random digit $y^r$ and the random digit $z^r$.

Similarly, a reader shall refer to the preceding part of the text for the detailed description of the encryption processing device, so as not to repeat here.

Corresponding to the abovementioned embodiment, the embodiment of the invention further accordingly provides an encryption processing method capable of defending the DPA attack, comprising the following steps of:

S100, dividing source data $p^r$ expected to Sbox table look-up operations into a plurality of random data on the basis of a random masking technique;

S200, carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and S300, carrying out longitudinal and transverse Sbox look-up process and real-time updating process of the preprocessing data $b^r$ on the basis of the random masking technique and according to a random digit $y^r$ and a random digit $z^r$.

In one specific embodiment, the implementation body in step S100 is the SecMasking unit. With continued reference to FIG. 2 and FIG. 3, the SecMasking unit is achieved in the structure that the universal random mask technique services as the basis, and in addition, the mutual XOR result of the plurality of random data is equal to the source data $p^r$.

In one specific embodiment, refers to FIG. 3, the SecMasking unit comprises a D trigger D0, a D trigger D1 and a D trigger D2 as well as a bitwise XOR device X1 and a bitwise XOR device X2, and the source data $p^r$ expected to carry out the Sbox table look-up operation is divided into three shares on the basis of the random masking technique, and thus is capable of defending the second-order differential power analysis. In the SecMasking unit:

(1) The source data $p^r$ and a random digit $i^r$ are provided to two input ends of the bitwise XOR device X1 respectively;

(2) The output end of the bitwise XOR device X1 is connected with one input end of the bitwise XOR device X2, and a random digit $j^r$ is provided to the other end of the bitwise XOR device X2;

(3) The output end of the bitwise XOR device X2 is connected with the data input end of the D trigger D0;

(4) The random digit $j^r$ is connected with the data input end of the D trigger D1;

(5) The random digit $i^r$ is connected with the data input end of the D trigger D2; and (6) The output ends of the D trigger D0, the D trigger D1 and the D trigger D2 are connected with the corresponding input end of the SecPrepare unit.

The SecMasking unit plays a role in dividing the given source data $p^r$ of the Sbox table look-up operation into a plurality of random data ($p^r_0$, $p^r_1$, and $p^r_2$ as shown in FIG. 3) on the basis of the different random digits ($i^r$ and $j^r$ as shown in FIG. 3) in each Sbox table look-up operation of the cryptographic equipment, and it satisfies that the XOR results of the plurality of random data ($p^r_0$, $p^r_1$, and $p^r_2$) are still $p^r$.

The beneficial effects of such transformation operation are that: the source data of each Sbox table look-up operation is not used for the table look-up operation directly in the overall situation, but replaced by more Sbox table look-up operations on multiple mathematically-random shares of the source data, so as to make it harder to achieve the power analysis of the real source data, i.e. increase the theoretical analysis attack cost from one unit to at least a plurality of units, for example, the three units corresponding in the embodiment.

In the step S200, the implementation body is the SecPrepare unit, which is achieved in the structure that the bitwise XOR device services as the basis. As shown in FIG. 4, the SecPrepare unit comprises a bitwise XOR device X3, a bitwise XOR device X4 and a bitwise XOR device X5, a linear transformation unit σ0, a linear transformation unit σ1 and a linear transformation unit σ2, an AddRoundKey transformation unit ARK, and a gcnt participated transformation unit GADD, wherein (1) The currently effective cryptographic algorithm sub-key $k^r$ and the random digit $x^r$ are provided to the input ends of the bitwise XOR device X3 respectively;

(2) Three data $p^r_0$, $p^r_1$, $p^r_2$ output by the D trigger D0, the D trigger D1 and the D trigger D2 contained in the SecMasking unit are accordingly provided to the input ends of the linear transformation unit σ0, the linear transformation unit σ1 and the linear transformation unit σ2;

(3) Both the output end of the bitwise XOR device X3 and the output end of the linear transformation unit σ0 are connected with two input ends of the AddRoundKey transformation unit ARK respectively;

(4) The output end of the linear transformation unit σ1 and the output end of the linear transformation unit σ2 are connected with two input ends of the bitwise XOR device X4 respectively;

(5) The output end of the AddRoundKey transformation unit ARK and the output end of the bitwise XOR device X4 are connected with two input ends of the bitwise XOR device X5 respectively;

(6) The output end of the bitwise XOR device X5 is connected with one input end of the gcnt participated transformation unit GADD, and the random digit $x^r$ and the real-time updating variable gcnt are provided to another two input ends of the gcnt participated transformation unit GADD respectively; and (7) The output end of the gcnt participated transformation unit GADD is connected with the input end of the SecSbox unit.

The linear transformation unit σ0, the linear transformation unit σ1 and the linear transformation unit σ2 are used for one linear transformation operation that may be defined before the Sbox table look-up operation in the cryptographic algorithm in the embodiment.

The AddRoundKey transformation unit ARK is used for one transformation operation that may be defined and combine the table look-up data to be performed and the currently effective cryptographic algorithm sub-key $k^r$ for cryptographic operation before the Sbox table look-up operation in the cryptographic algorithm in the embodiment.

The gcnt participated transformation unit GADD is used for counteracting the participation of the random digit $x^r$ in the embodiment and adding the participation of the real-time updating variable gcnt to achieve the scheme of "the table look-up result of the SecSbox unit circuit is longitudinally updated on the basis of the random masking technique in real time".

For example, in a mode of execution, the gcnt participated transformation unit GADD carries out the following processes on the basis of the input information:

(1) Carrying out bitwise XOR operation on the output information of the bitwise XOR device X5 and the random digit $x^r$; and (2) Carrying out Boolean addition operation on the bitwise XOR operation results and the real-time updating variable gcnt, and outputting the preprocessing data $b^r$.

It is not difficult to know that those skilled in the art can change and modify the achievement structure of the gcnt participated transformation unit GADD of the invention as required to protect, without substantially departing from the spirit and principles of the invention. All the modifications and changes are contained in the scope of the invention.

The SecPrepare unit plays a role in carrying out the AddRoundKey transformation operation defined by the cryptographic algorithm standard and improving the safety due to the participation of the random digit $x^r$ on the plurality of intermediate random data (e.g., $p^r_0$, $p^r_1$ and $p^r$ as shown in FIG. 4) output by the SecMasking unit and the currently effective cryptographic algorithm sub-key $k^r$ of the cryptographic algorithm with the participation of the new random digit $x^r$.

In addition, the relevant transformation operation with the participation of the real-time updating variable gcnt is further added in order to achieve the safety of the subsequence SecSbox transformation unit. The SecPrepare circuit unit in such design has the beneficial effects of: not only improving the safety of the subsequence SecSbox transformation operations, but also avoiding changing the achievement structure of the so-called cryptographic algorithm round key expansion operation, thus saving the cost of the area resource of the cryptographic equipment.

In the step S300, the implementation body is the SecSbox unit. In the embodiment, the SecSbox unit is achieved in a mode that table look-up results are updated longitudinally and transversely in real time on the basis of the random masking technique. preferably, a plurality of target data are obtained after carrying out longitudinal and transverse Sbox look-up process and real-time updating process of the preprocessing data $b^r$ on the basis of the random masking technique and according to a random digit Y and a random digit $z^r$; in the event of specific implementation, in the final step of cryptographic operation, the expected look-up result $m^r$ can be obtained by mutual XOR operation process on the plurality of target data; or in the intermediate step of the cryptographic operation, the plurality of target data can be used as the source data for the next Sbox table look-up operation.

As shown in FIG. 5, the SecSbox unit comprises N non-linear transformation SecS basic unit, in particular, in the SecSbox:

(1) The preprocessing data $b^r$ output by the SecPrepare unit is divided into a plurality of copies (i.e., $b^1_r$, $b^{1'r}$, $b^{\cdots r}$ in FIG. 5, $b^{Nr}$ represents N copies, meeting $b^r=\{b^{1r}|b^{\cdots r}|b^{Nr}\}$) and input into the corresponding N differential SecS basic units respectively; and each copy of data of the divided $b^r$ is connected with one input end of the corresponding SecS basic unit (i.e., $b^{ir}$ and SecSi as shown in FIG. 5, wherein i=1, . . . , N);

(2) Both the random digit $y^r$ and the random digit $z^r$ are provided to another two input ends of each SecS basic unit respectively; and (3) The same type of output end of each SecS basic unit is subject to piecing process respectively to form an output end data $m^r_0$, an output end data $m^r_1$ and an output end data $m^r_2$, wherein the bitwise XOR operation results of the output end data $m^r_0$, the output end data $m^r_1$ and the output end data $m^r_2$ are equal to the relevant arithmetic operation results on the basis of the source data $p^r$, the cryptographic algorithm sub-key $k^r$ and cryptographic algorithm common Sbox table look-up operation.

For example, in one description of the preferred embodiment, the output data of the SecSbox unit can be divided into three shares, and thus the second-order DPA attack can be defended by the data division. It is not difficult to know that those skilled in the art can change and modify the output data of the SecSbox unit, without substantially departing from the spirit and principles of the invention. All the modifications and changes need to be contained in the scope disclosed by the invention.

The SecSbox circuit unit plays a main role in dividing input objects for the several SecS basic units inside it and introducing the random digit $y^r$ and the random digit $z^r$, so as to attempt to achieve the relevant power masking in the SecS transformation operation via the random masking technique.

In the embodiment of the invention, as shown in FIG. 6, the SecS basic unit comprises a multiplexer M0, a multiplexer M1 and a multiplexer M2, their corresponding a D trigger group Dm00~Dm0k, a D trigger group Dm10~Dm1k and a D trigger group Dm20~Dm2k, and a bitwise XOR device group Xm00~Xm0k, a bitwise XOR device group Xm10~Xm1k and a bitwise XOR device group Xm20~Xm2k, the SecS basic unit consists of three groups of similar basic units, capable of defending the second-order DPA attack. In particular, wherein:

(1) After the preprocessing data $b^r$ output by the SecPrepare unit are divided into a plurality of copies, the data $b^{ir}$ provided to the current SecS basic unit are provided to control selection ends of the multiplexer M0, the multiplexer M1 and the multiplexer M2;

(2) A plurality of data alternative ends of the multiplexer M0, the multiplexer M1 and the multiplexer M2 are connected with the output ends of the plurality of D triggers in the corresponding D trigger group, respectively;

(3) The output ends of the plurality D triggers in the D trigger group corresponding to the multiplexer M0, the multiplexer M1 and the multiplexer M2 are connected with the output ends of the plurality of bitwise XOR devices in the corresponding bitwise XOR device group respectively;

(4) The random digit $y^r$ is provided to one input end of the plurality of bitwise XOR devices in the bitwise XOR device group Xm00~Xm0k respectively, the random digit $z^r$ is provided to one input end of the plurality of bitwise XOR devices in the bitwise XOR device group Xm10~Xm1k respectively, and the bitwise XOR operation results of the random digit $y^r$ and the random digit $z^r$ are provided to one input end of the plurality of bitwise XOR devices in the bitwise XOR device group Xm20~Xm2k respectively;

(5) The output ends of the plurality of D triggers in the D trigger group are connected with the corresponding other input ends of the plurality of bitwise XOR devices in the bitwise XOR device group in an annular chain type; for example, the other input end of the plurality of bitwise XOR devices in each bitwise XOR device group is connected with the output end of the adjacent D trigger in the D trigger group corresponding to the XOR device group accordingly, thereby forming a chained ring;

(6) The output ends of the multiplexer M0, the multiplexer M1 and the multiplexer M2 output data to be spliced $m^{ir}_0$, $m^{ir}_1$ and $m^{ir}_2$, respectively, wherein i=1~N.

The SecS basic unit plays a main role in achieving the safety table look-up operation of the input data. One of the safety characteristics is to equivalently transform the table look-up operation of the single object into the plurality of table look-up operations, i.e., to transversely update in real time on the basis of the random masking technique; and the other of the safety characteristics is to transfer and store the table look-up result between relevant table look-up registers in real time, i.e., to longitudinally update in real time on the basis of the random masking technique.

In the embodiment of the invention, the most obvious advantages of the above-mentioned safety characteristics are as follows: transforming the direct and cured table look-up operation on the input data into the plurality of indirect and dynamically updated table look-up operation, thereby greatly masking the leakage of power consumption information of the original table look-up operation. With using the above-mentioned defending means described in the invention, an attacker originally only needs to collect the single copy of the power consumption information, but now needs to collect the plurality of power consumption information leaked at the same time in order to implement the DPA attack. In this way, not only the sample collection quantity and the collection difficulty of the power consumption information as required for the analysis attack are greatly increased, but also the calculation complexity of the DPA is increased exponentially.

Thus, by adopting the invention, in plurality of parts the most critical nonlinear transformation leakage power consumption which is represented by the Sbox table look-up operation in the cryptographic algorithm can be masked via the universal random masking technique at the premise of not greatly increasing the cost of the area resource.

The foregoing is merely the preferred embodiment of the invention, but not intended to limit the patent scope of the invention. Any equivalent structure or equivalent procedure transformation made by means of the description and the attached drawings of the invention, or directly or indirectly operating in other relevant arts shall pertain to the scope of patent protection of the invention.

The invention claimed is:

1. An encryption processing device capable of defending differential power analysis attack, comprising:
   a mask processing circuit (SecMasking) unit, used for splitting source data $p^r$ expected to carry out Sbox table look-up operations into a plurality of random data on the basis of a random masking technique;
   a preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and
a Sbox circuit (SecSbox) unit, used for carrying out longitudinal and transverse Sbox look-up process and real-time updating process of the preprocessing data $b^r$ on the basis of the random masking technique and according to a random digit $Y^r$ and a random digit $Z^r$;
wherein the SecPrepare unit comprises a bitwise XOR device X3, a bitwise XOR device X4 and a bitwise XOR device X5, a linear transformation unit σ0, a linear transformation unit σ1 and a linear transformation unit σ2, an AddRoundKey transformation unit ARK, and a gcnt participated transformation unit GADD, wherein
the currently effective cryptographic algorithm sub-key $k^r$ and the random digit $x^r$ are provided to the input ends of the bitwise XOR device X3 respectively;
three data pr0, pr1, pr2 output by the D trigger D0, the D trigger D1 and the D trigger D2 contained in the SecMasking unit are accordingly provided to the input ends of the linear transformation unit G0, the linear transformation unit σ1 and the linear transformation unit σ2;
both the output end of the bitwise XOR device X3 and the output end of the linear transformation unit σ0 are connected with two input ends of the AddRoundKey transformation unit ARK respectively;
the output end of the linear transformation unit σ1 and the output end of the linear transformation unit σ2 are connected with two input ends of the bitwise XOR device X4 respectively;
the output end of the AddRoundKey transformation unit ARK and the output end of the bitwise XOR device X4 are connected with two input ends of the bitwise XOR device X5 respectively;
the output end of the bitwise XOR device X5 is connected with one input end of the gcnt participated transformation unit GADD, and the random digit xr and the real-time updating variable gcnt are provided to another two input ends of the gcnt participated transformation unit GADD respectively; and
the output end of the gcnt participated transformation unit GADD is connected with the input end of the SecSbox unit.

2. The encryption processing device capable of defending the differential power analysis attack according to claim 1, wherein the SecMasking unit comprises a D trigger D0, a D trigger D1 and a D trigger D2 as well as a bitwise XOR device X1 and a bitwise XOR device X2, wherein
the source data $p^r$ and a random digit $i^r$ are provided to two input ends of the bitwise XOR device X1 respectively;
the output end of the bitwise XOR device X1 is connected with one input end of the bitwise XOR device X2, and a random digit $j^r$ is provided to the other end of the bitwise XOR device X2;
the output end of the bitwise XOR device X2 is connected with the data input end of the D trigger D0;
the random digit $j^r$ is connected with the data input end of the D trigger D1;
the random digit $i^r$ is connected with the data input end of the D trigger D2; and
the output ends of the D trigger D0, the D trigger D1 and the D trigger D2 are connected with the corresponding input end of the SecPrepare unit.

3. An integrated circuit chip, comprising the encryption processing device capable of defending the differential power analysis attack according to claim 2.

4. The encryption processing device capable of defending the differential power analysis attack according to claim 1, wherein the gcnt participated transformation unit GADD carries out the following processes on the basis of the input information:
carrying out bitwise XOR operation on the output information of the bitwise XOR device X5 and the random digit $x^r$; and
carrying out Boolean addition operation on the bitwise XOR operation results and the real-time updating variable gcnt, and outputting the preprocessing data $b^r$.

5. An integrated circuit chip, comprising the encryption processing device capable of defending the differential power analysis attack according to claim 4.

6. The encryption processing device capable of defending the differential power analysis attack according to claim 1, wherein the SecSbox unit comprises N non-linear transformation SecS basic units, in the SecSbox unit:
the preprocessing data $b^r$ output by the SecPrepare unit is divided into a plurality of copies and input into the corresponding N may-be-different SecS basic units respectively;
both the random digit $y^r$ and the random digit $z^r$ are provided to another two input ends of each SecS basic unit respectively; and
the same type of output end of each SecS basic unit is subject to piecing process respectively to form an output end data $m^r_0$, an output end data $m^r_1$ and an output end data $m^r_2$, wherein the bitwise XOR operation results of the output end data $m^r_0$, the output end data $m^r_1$ and the output end data $m^r_2$ are equal to the relevant arithmetic operation results on the basis of the source data $p^r$, the cryptographic algorithm sub-key $k^r$ and cryptographic algorithm common Sbox table look-up operation.

7. An integrated circuit chip, comprising the encryption processing device capable of defending the differential power analysis attack according to claim 6.

8. The encryption processing device capable of defending the differential power analysis attack according to claim 6, wherein the SecS basic unit comprises a multiplexer M0, a multiplexer M1 and a multiplexer M2, corresponding a D trigger group Dm00~Dm0k, a D trigger group Dm10~Dm1k and a D trigger group Dm20~Dm2k, and a bitwise XOR device group Xm00~Xm0k, a bitwise XOR device group Xm10~Xm1k and a bitwise XOR device group Xm20~Xm2k, wherein
after the preprocessing data $b^r$ output by the SecPrepare unit are divided into a plurality of copies, the data $b^{ir}$ provided to the current SecS basic unit are provided to control selection ends of the multiplexer M0, the multiplexer M1 and the multiplexer M2;
a plurality of data alternative ends of the multiplexer M0, the multiplexer M1 and the multiplexer M2 are connected with the output ends of the plurality of D triggers in the corresponding D trigger group, respectively;
the output ends of the plurality D triggers in the D trigger group corresponding to the multiplexer M0, the multiplexer M1 and the multiplexer M2 are connected with the output ends of the plurality of bitwise XOR devices in the corresponding bitwise XOR device group respectively;

the random digit $y^r$ is provided to one input end of the plurality of bitwise XOR devices in the bitwise XOR device group Xm00~Xm0k respectively, the random digit $z^r$ is provided to one input end of the plurality of bitwise XOR devices in the bitwise XOR device group Xm10~Xm1k respectively, and the bitwise XOR operation results of the random digit $y^r$ and the random digit $z^r$ are provided to one input end of the plurality of bitwise XOR devices in the bitwise XOR device group Xm20~Xm2k respectively;

the output ends of the plurality of D triggers in the D trigger group are connected with the corresponding other input ends of the plurality of bitwise XOR devices in the bitwise XOR device group in an annular chain type; and the output ends of the multiplexer M0, the multiplexer M1 and the multiplexer M2 output data to be spliced $m^{ir}_0$, $m^{ir}_1$ and $m^{ir}_2$, respectively, wherein i=1~N.

9. An integrated circuit chip, comprising the encryption processing device capable of defending the differential power analysis attack according to claim 8.

10. An integrated circuit chip, comprising the encryption processing device capable of defending the differential power analysis attack according to claim 1.

11. An encryption processing device capable of defending differential power analysis attack, comprising:
   a mask processing circuit (SecMasking) unit, used for splitting source data $p^r$ expected to carry out Sbox table look-up operations into a plurality of random data on the basis of a random masking technique;
   a preprocessing circuit (SecPrepare) unit, used for carrying out AddRoundKey transformation on the plurality of random data and currently effective cryptographic algorithm sub-key $k^r$ according to random digit $x^r$, carrying out Sbox transformation preprocessing which can at least take away the participation effect of the random digit $x^r$ based upon a real-time updating variable gcnt and outputting the preprocessing data $b^r$; and
   a Sbox circuit (SecSbox) unit, used for carrying out longitudinal and transverse Sbox look-up process and real-time updating process of the preprocessing data $b^r$ on the basis of the random masking technique and according to a random digit $y^r$ and a random digit $Z^r$;
   wherein the SecSbox unit comprises N non-linear transformation SecS basic units, in the SecSbox unit:
   the preprocessing data $b^r$ output by the SecPrepare unit is divided into a plurality of copies and input into the corresponding N may-be-different SecS basic units respectively;
   both the random digit $y^r$ and the random digit $z^r$ are provided to another two input ends of each SecS basic unit respectively; and
   the same type of output end of each SecS basic unit is subject to piecing process respectively to form an output end data $m^r_0$, an output end data $m^r_1$ and an output end data $m^r_2$, wherein the bitwise XOR operation results of the output end data $m^r_0$, the output end data $m^r_1$ and the output end data $m^r_2$ are equal to the relevant arithmetic operation results on the basis of the source data $p^r$, the cryptographic algorithm sub-key $k^r$ and cryptographic algorithm common Sbox table look-up operation;
   wherein the SecS basic unit comprises a multiplexer M0, a multiplexer M1 and a multiplexer M2, corresponding a D trigger group Dm00~Dm0k, a D trigger group Dm10~Dm1k and a D trigger group Dm20~Dm2k, and a bitwise XOR device group Xm00~Xm0k, a bitwise XOR device group Xm10~Xm1k and a bitwise XOR device group Xm20~Xm2k, wherein
      after the preprocessing data $b^r$ output by the SecPrepare unit are divided into a plurality of copies, the data $b^{ir}$ provided to the current SecS basic unit are provided to control selection ends of the multiplexer M0, the multiplexer M1 and the multiplexer M2;
      a plurality of data alternative ends of the multiplexer M0, the multiplexer M1 and the multiplexer M2 are connected with the output ends of the plurality of D triggers in the corresponding D trigger group, respectively;
      the output ends of the plurality D triggers in the D trigger group corresponding to the multiplexer M0, the multiplexer M1 and the multiplexer M2 are connected with the output ends of the plurality of bitwise XOR devices in the corresponding bitwise XOR device group respectively;
      the random digit $y^r$ is provided to one input end of the plurality of bitwise XOR devices in the bitwise XOR device group Xm00~Xm0k respectively, the random digit $z^r$ is provided to one input end of the plurality of bitwise XOR devices in the bitwise XOR device group Xm10~Xm1k respectively, and the bitwise XOR operation results of the random digit $y^r$ and the random digit $z^r$ are provided to one input end of the plurality of bitwise XOR devices in the bitwise XOR device group Xm20~Xm2k respectively;
      the output ends of the plurality of D triggers in the D trigger group are connected with the corresponding other input ends of the plurality of bitwise XOR devices in the bitwise XOR device group in an annular chain type; and
      the output ends of the multiplexer M0, the multiplexer M1 and the multiplexer M2 output data to be spliced $m^{ir}_0$, $m^{ir}_1$ and $m^{ir}_2$, respectively, wherein i=1~N.

12. An integrated circuit chip, comprising the encryption processing device capable of defending the differential power analysis attack according to claim 11.

* * * * *